United States Patent [19]

Hope et al.

[11] 4,332,483

[45] Jun. 1, 1982

[54] MIXING APPARATUS

[76] Inventors: Henry F. Hope; Stephen F. Hope, both of 2421 Wyandotte Rd., Willow Grove, Pa. 19090

[21] Appl. No.: 119,759

[22] Filed: Feb. 8, 1980

Related U.S. Application Data

[63] Continuation-in-part of Ser. No. 76,172, Sep. 17, 1979.

[51] Int. Cl.³ .......................... B01F 5/12; B01F 15/02; G05D 11/02
[52] U.S. Cl. .................................... 366/132; 366/134; 366/137; 366/152; 366/161; 366/173; 366/179; 366/190; 366/262
[58] Field of Search .................................... 366/14–16, 366/76, 91, 101, 102, 106, 107, 134, 136, 137, 154, 151–153, 160, 161, 171, 167, 173, 174, 177, 179, 190, 262, 263, 336, 340, 131, 132, 267–269; 137/112

[56] References Cited

U.S. PATENT DOCUMENTS

| | | | |
|---|---|---|---|
| 1,391,013 | 9/1921 | Schwager | 366/171 |
| 1,773,619 | 8/1930 | Goebels | 366/106 |
| 2,600,877 | 6/1952 | Jeffree | |
| 2,641,271 | 6/1953 | Pressler | |
| 2,645,463 | 7/1953 | Stearns | |
| 3,442,453 | 5/1969 | Whitehouse, Jr. | |
| 3,450,389 | 6/1969 | McCurdy | 366/106 |
| 3,484,214 | 12/1969 | Gehring et al. | 366/173 |
| 3,544,079 | 12/1970 | Dressler | 366/173 |
| 3,559,959 | 2/1971 | Davis et al. | 366/174 |
| 3,799,508 | 3/1974 | Arnold et al. | 366/174 |
| 4,007,921 | 2/1977 | Zingg | 366/136 |
| 4,165,186 | 8/1979 | Tortorich et al. | 366/153 |

FOREIGN PATENT DOCUMENTS 1354841  5/1974  United Kingdom ................ 366/336

*Primary Examiner*—Philip R. Coe
*Assistant Examiner*—Timothy F. Simone
*Attorney, Agent, or Firm*—Z. T. Wobensmith, 2nd; Z. T. Wobensmith, III

[57] ABSTRACT

Mixing apparatus is described in which a plurality of chemical materials are to be incorporated in a carrier liquid, which may be a solvent, such as water, and which is quantitatively predominant, some of the chemical materials being incompatible if brought together directly, or in a wrong sequence, or which are difficult to combine, the materials being combined in the desired proportions in a cascaded arrangement of liquid filled chambers, the respective materials in the desired proportions preferably being supplied from separate sources of materials by pumps, the delivery of the carrier liquid being to a first mixing chamber to which a first chemical material is supplied, the contents of the first mixing chamber being delivered to a second mixing chamber to which another material is supplied, the fluid from the second mixing chamber being delivered to a third mixing chamber to which another chemical material may be added, with additional mixing chambers and pumps as desired to accommodate additional chemical materials, the pumps preferably being simultaneously driven from a single power source and each delivering a controlled quantity of chemical material, with shut off in the event of exhaustion of one of the materials and with shut off if a predetermined quantity of the mixture is available. The material in each mixing chamber is preferably agitated to enhance the mixing. Provision is made to receive trapped gas from a storage chamber having the mixture therein and return the gas to the storage chamber as determined by the liquid level therein. A simplified construction of successive mixing chambers in a tank is disclosed.

15 Claims, 5 Drawing Figures

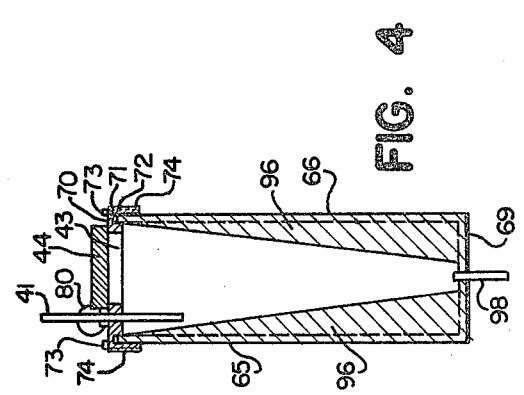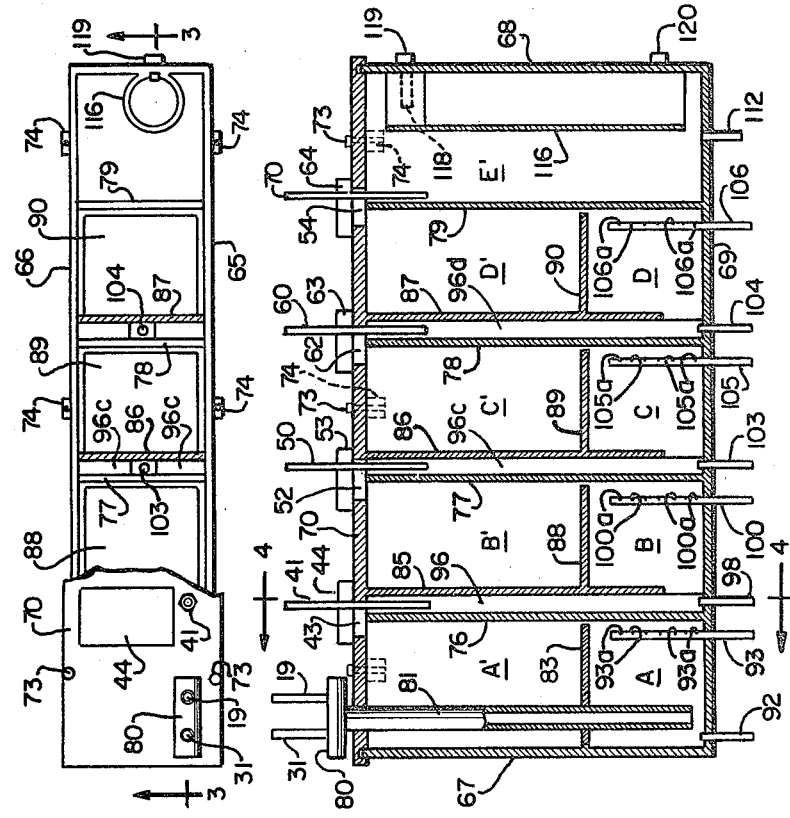

MIXING APPARATUS

CROSS REFERENCE TO RELATED APPLICATION

This application is a continuation in part of our prior application for Mixing Apparatus, filed Sept. 17, 1979, now Ser. No. 76,172.

BACKGROUND OF THE INVENTION

1. Field of the Invention

This invention relates to mixing apparatus for a plurality of different liquid materials.

2. Description of the Prior Art

It has heretofore been proposed to supply a plurality of fluid components to be combined to a common receiver or supply line. One such system is shown in U.S. Pat. No. 2,641,271 to Pressler. This may involve difficulties if one or more of the chemical materials is incompatible and the structure required is expensive.

Whitehouse, U.S. Pat. No. 3,442,453 shows a similar structure.

Jeffree, in U.S. Pat. No. 2,600,877, shows a device for mixing fluids in which a main pipe 20 has an interposed interrupter 24 for periodically blocking fluid passing through the main pipe 20. A branch pipe 22 leads into the main pipe through a one way valve 23 in a mixing chamber 26 beyond the interrupter 24 so that the inertia of the leading column of liquid beyond the interrupter 24 creates a suction to open the valve 23 and draw a small quantity of liquid B from the pipe 22.

In FIG. 3 two branch pipes 22 and 28 are shown as fed in series into the main pipe thus necessitating two mixing chambers 25 and 29, two inertia columns 21 and 30 and two interrupters 24 and 31.

In FIG. 4 is illustrated apparatus for mixing a very small proportion of fluid B with another fluid A.

Jeffree has no provisions for positive feeding of measured quantities of additives, no provisions for effective agitation to insure mixing, no control in the event of exhaustion of one of the materials to be added and no shut-down when a predetermined quantity of the proper mixture is available.

Stearns, in U.S. Pat. No. 2,645,463, shows method and apparatus for continuous flow mixing. In FIG. 3, a common conduit 3 for fluids has conduit elements 11, 12 and 13 with discharge end portions 11a, 12a and 13a, respectively, opening into the conduit 3. Each of the individual conduit members has structure therein intended for inducing turbulent flow, orifice plate members 11b, 12b and 13b being provided for this purpose. As shown two fluid streams are introduced into the common conduit 3 by the conduits 11 and 12 to be mixed in the zone 14. The stream is advanced past baffle members 15 to induce turbulent flow in the previously combined stream and to homogenize the mixture in the zone 14 prior to introduction of fluid through conduit 13 and its orifice plate member 13b. The reference to homogenizing indicates an attempt to combine substantially immiscible or difficultly miscible materials rather than combining soluble chemical materials. Stearns appears to have a continuously flowing stream and is silent as to the manner of supplying the fluid through the individual conduits and does not undertake to supply any measured quantities of materials. Careful sizing of the main conduit of Stearns, and the conduit elements with their orifices, would be required to induce turbulent flow of a character to achieve the mixing and homogenization desired by Stearns if in fact it could be achieved. If the quantities to be introduced were very small in proportion to the fluid stream there would be a serious problem as to the effectiveness of these small quantities to produce turbulence at a mixing zone and serious doubt as to the efficiency of the distribution of the material thus added.

Stearns also has no provisions for shut-off if a material to be added was exhausted and no provisions for shut-off when an adequate supply of the mixture was available.

SUMMARY OF THE INVENTION

In accordance with the invention mixing apparatus is disclosed for successively adding chemical materials to a carrier liquid, such as water, which may be a solvent and which is the predominant quantitative material and particularly where some of the chemical materials may be incompatible, in a cascaded arrangement of successive liquid filled chambers in series in a closed tank, the respective chemical materials being separately supplied in the desired proportions by pumps, preferably adjustable as to output, which can be driven from a common power source, the carrier liquid and a first chemical material being delivered to a first mixing chamber in the tank and mixed therein with the contents of the first mixing chamber being delivered to a second mixing chamber in the tank into which a second chemical material is introduced and mixed, additional mixing chambers with chemical materials supplied thereto being provided in the tank to meet the requirements for the number of chemical materials to be brought together, with a storage chamber in the tank having an auxiliary chamber preferably in the form of an expansible bag, connected to the storage chamber for receiving trapped gas from the storage chamber as the liquid level rises in the storage tank and for returning the trapped gas to the storage chamber as the liquid level falls in the tank, and with controls for shutting off operation when one of the materials to be added is exhausted and when an adequate quantity of the mixture is available in the storage chamber.

It is the principal object of the invention to provide mixing apparatus for chemical materials to be added to a carrier liquid which is simple in construction and is free of complications which add to the difficulty of assembly and cost.

It is a further object of the invention to provide a mixing system which is simple in construction so as to reduce operating problems.

It is a further object of the invention to provide mixing apparatus in which the components are simple in construction and easy to assemble.

It is a further object of the invention to provide mixing apparatus in which provisions are made for shut-down in the event of exhaustion of one of the materials to be added.

It is a further object of the invention to provide mixing apparatus in which the output is delivered to a storage chamber and which is shut down when an adequate quantity of liquid mixture is present in the storage chamber.

It is a further object of the invention to provide mixing apparatus in which a closed storage chamber is utilized having trapped air therein which is delivered from the storage chamber to an auxiliary chamber preferably in the form of an expansible bag when the liquid level in the storage chamber rises and returns to the storage chamber when the liquid level falls.

It is a further object of the invention to provide a closed tank having a plurality of mixing chambers and a storage chamber therein separated by partitions mounted in the tank and carried in part, if desired, by a lid on the tank.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 2 is a top plan view of a preferred form of mixing apparatus in accordance with the invention part, of the lid or cover being broken away to show the interior;

FIG. 3 is a longitudinal vertical sectional view taken approximately on the line 3—3 of FIG. 2;

FIG. 4 is a transverse vertical sectional view taken approximately on the line 4—4 of FIG. 3.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Figure 1:
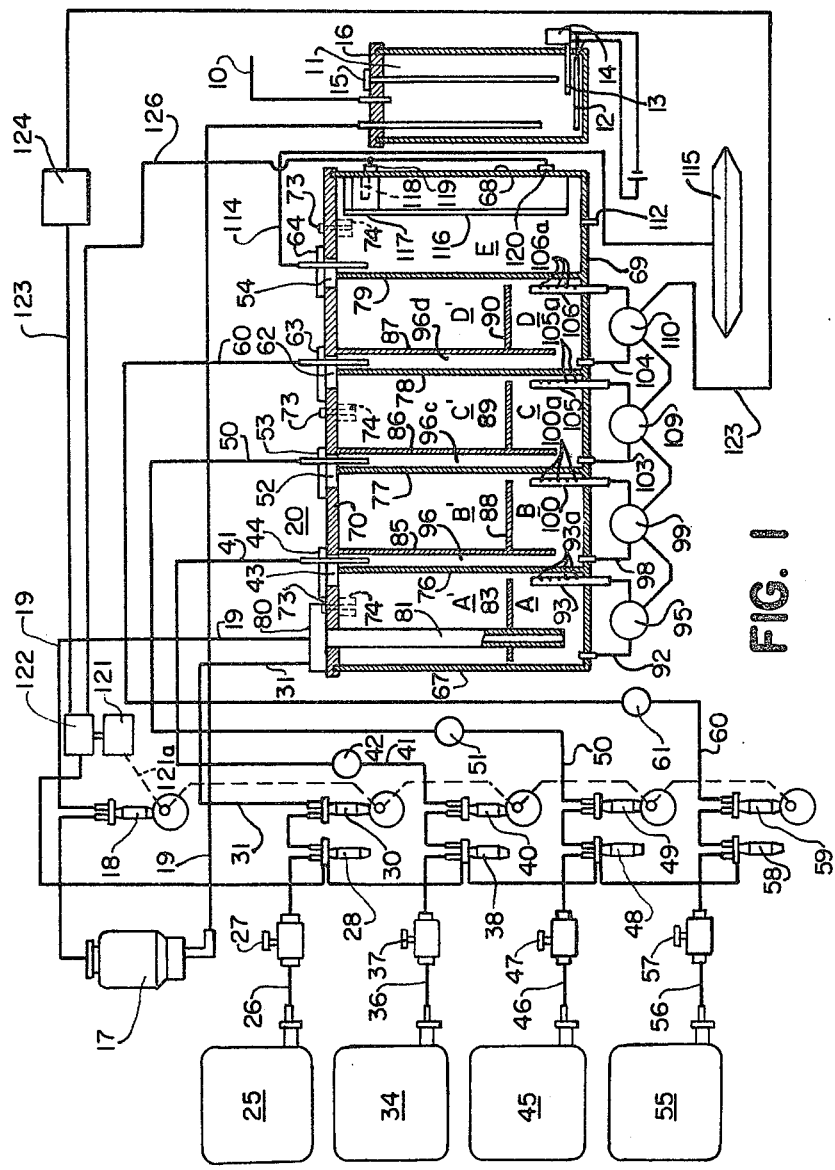
FIG. 1 is a diagrammatic view of mixing apparatus in accordance with the invention.

Referring now more particularly to FIG. 1, a diagrammatic view of the invention is therein shown, FIGS. 2 to 5, inclusive, showing the details of the mixing tank 20.

A supply connection 10 for carrier liquid is provided which may extend through a heating vessel 11 having a heating coil 12 therein with an immersion thermocouple 13 connected thereto, to an adjustable controller 14 and to a suitable source of electrical energy for maintaining the temperature of the liquid at the desired level. A thermometer 15 carried by the lid or cover 16 of the vessel 11 permits of visual observation of the liquid temperature in the vessel 11. The vessel 11 is preferably connected to a transparent bottle or other suitable receptacle 17 for observing the presence of liquid from the supply connection 10. The nature of the carrier liquid and the temperature at which will be maintained will be determined by the materials to be added and the ultimate use to be made of the liquid mixture. For many purposes the carrier liquid will be water, and will be the predominant constituent for some purposes, but the mixing apparatus is not restricted in its use to this specific liquid. Other carriers, including organic liquids, can be employed.

The receptacle 17 is connected by the supply connection 10 to a pump 18. The pump 18 can be of any desired type for supplying a measured quantity of the carrier liquid. For this purpose a positive displacement bellows pump having an adjustable stroke to determine the measured quantity of liquid will serve for purposes where a measured quantity of a few gallons is provided. The pump 18 has a delivery connection 19 to the mixing tank 20.

A first chemical supply reservoir 25 is provided for a first chemical material to be added and mixed which is preferably connected by a fluid connection such as a delivery pipe 26 through a manually operable shut-off valve 27 and control apparatus 28 including a bellows responsive to liquid flow to to discontinue mixing if the reservoir 25 is empty. Suitable control apparatus for this purpose is shown in our prior U.S. Pat. No. 4,118,150.

The pipe 26 provides a supply connection for a pump 30. The pump 30 can be of any desired type for supplying a measured quantity of liquid from the reservoir 25. For this purpose a positive displacement bellows pump having an adjustable stroke to determine the quantity of liquid delivered may be employed. The pump 30 is connected by a delivery connection 31 to a predetermined location at the mixing tank 20.

A second chemical supply reservoir 34 can be provided for a second chemical material to be added and mixed in the mixing tank 20. The reservoir 34 is preferably connected by a fluid connection 36, such as a delivery pipe, through a manually operable shut-off valve 37 and control apparatus 38 similar to the control apparatus 28. Liquid in the fluid connection or pipe 36 is supplied to a pump 40 which is preferably similar to the pump 30. The pump 40 has a fluid connection 41, such as a pipe, to a predetermined location at the mixing tank 20. A non-return or check valve 42 can be provided in the pipe 41.

A third chemical supply reservoir 45 can be provided, if desired, for a third chemical material to be added and mixed in the mixing tank 20. The reservoir 45 is preferably connected by a fluid connection 46, such as a delivery pipe, through a manually operable shut-off valve 47 and control apparatus 48, similar to the control apparatus 28. Liquid in the fluid connection or pipe 46 is supplied to a pump 49, which is preferably similar to the pump 30. The pump 49 has a fluid connection or pipe 50 extending to a predetermined location at the mixing tank 20. A non-return or check valve 51 may be provided in the fluid connection 50.

A fourth chemical supply reservoir 55 can be provided, if desired, for a fourth chemical material to be added and mixed in the mixing tank 20. The reservoir 55 is preferably connected by a fluid connection 56, such as a delivery pipe, through a manually operable shut-off valve 57 and control apparatus 58, similar to the control apparatus 28. Liquid in the fluid connection or pipe 56 is supplied to a pump 59 which is preferably similar to the pump 30. The pump 59 has a fluid connection or pipe 60 extending to a predetermined location at the mixing tank 20. A non-return or check valve 61 may be provided in the fluid connection 60.

The number of supply reservoirs and associated structure may be increased or decreased, as desired, and to accommodate the specific materials to be incorporated into the liquid finally obtained.

The mixing tank 20, as shown in detail in FIGS. 2, 3, 4 and 5, preferably has side walls 65 and 66, end walls 67 and 68, a bottom wall 69 and a top cover 70. The top cover 70 has a groove 71 thereon with a gasket 72 for engagement with the top edges of the walls 65, 66, 67 and 68. Screws 73 engaged in internally threaded bosses 74 removably retain the top cover 70 in sealed relation to the tank 20.

The tank 20 has a plurality of interiorly disposed fixed partition walls 76, 77, 78 and 79, parallel to the end walls 67 and 68, extending between and secured to the side walls 65 and 66 and the bottom wall 69 of the tank 20, the partition walls 76, 77, 78 and 79 each extending upwardly to the top cover 70.

Figure 5:
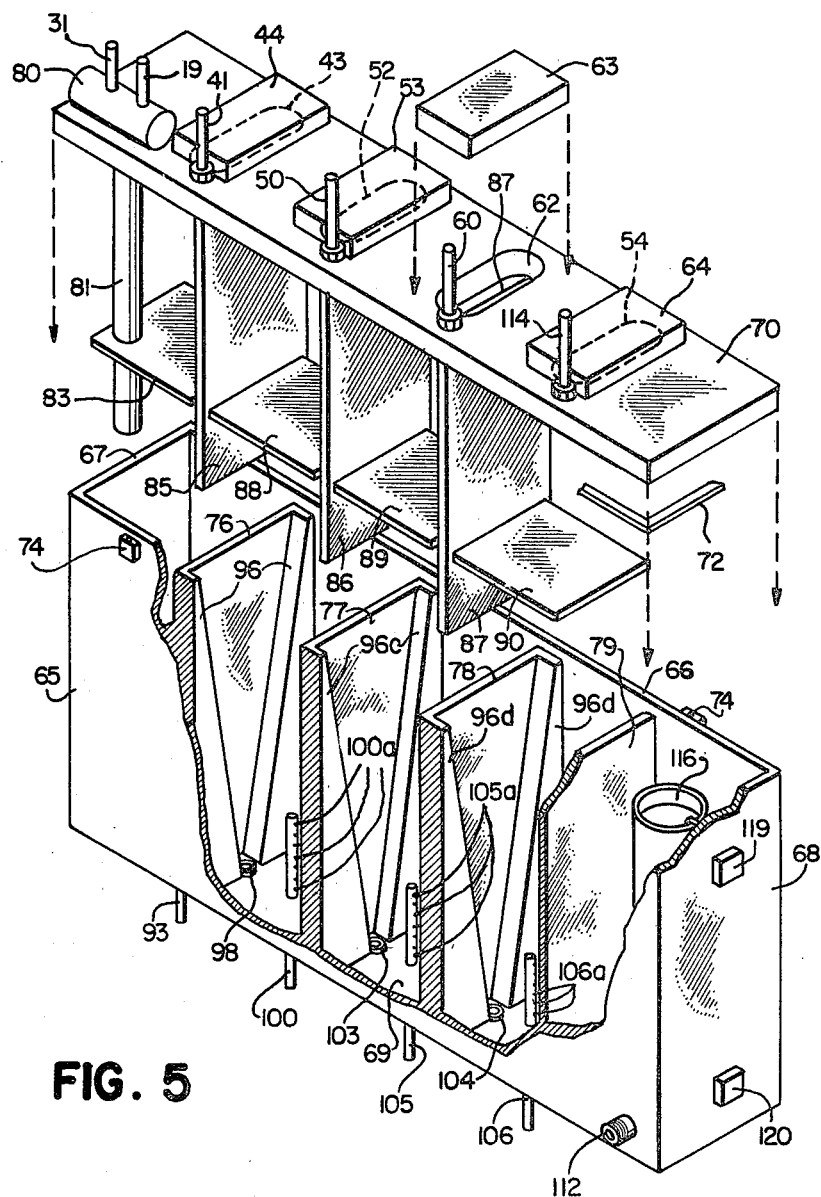
FIG. 5 is an exploded perspective view of the tank and cover.

The cover 70, as shown in detail in FIG. 5, has a manifold 80 mounted thereon with a downwardly extending tube 81 communicating with the interior of the manifold 80 for downward delivery of liquid materials, as hereinafter explained, into a chamber A.

The tube 81, spaced upwardly from the bottom thereof has a horizontal plate 83 secured thereto about one third of the distance between the wall 69 and the cover 70, measured from the bottom wall 69, the plate 83 having its side margins spaced from the end wall 67 and contiguous portions of the side walls 65 and 66 to permit liquid to move from a location at A below the plate 83 to a communicating location A' above the plate 83.

The space bounded by the wall 67, contiguous portions of the side walls 65 and 66 and the partition wall 76 provides a mixing location or space at A, below the plate 83, for introduction and mixing of a carrier liquid supplied by the pump 18 through a liquid delivery connection 19, and a first chemical material to be added, supplied by the pump 30 through a delivery connection 31. The storage space or location A', above the plate 83, receives the liquid from the location A.

The cover 70 has downwardly extending vertical walls 85, 86, and 87 secured thereto, terminating above the bottom wall 69 of the tank 20, each having a horizontal plate 88, 89 and 90 secured thereto in spaced relation to the bottom wall 69 of the tank 20, and located about one third of the distance between the wall 69 and the cover 70, measured from the bottom wall 69.

A fluid connection 92 is provided at the bottom of the space A for withdrawal of liquid and a return fluid connection 93 extending above the bottom wall and having a plurality of nozzle openings 93a directed toward the wall 76 in the space A, for return of liquid for agitation in the space A for mixing. An electric motor driven pump 95 is preferably interposed between the fluid connections 92 and 93.

The wall 85 is spaced from the wall 76 and maintained in spaced relation by downwardly extending converging walls 96 (see FIG. 4) secured to the wall 76, and spaced at the bottom for a fluid connection 98.

The top cover 70 has a slot 43 straddling the top edge of the wall 76 which is covered by a plate 44 secured to the top cover 70, to avoid transfer of air or gas to the next space and may be vented if desired.

The top cover 70 has the delivery connection 41 extending therethrough for liquid delivery into the liquid passing in the slot 43 over the top edge of the wall 76 and into the top of the space between the walls 76 and 85 and the converging walls 96 for downward movement to the bottom wall 69 to the fluid connection 98. The lower part of the location B is also in communication with the fluid connection 98.

The fluid connection 98 is connected through a motor driven pump 99 to a return fluid connection 100 extending above the bottom wall and having a plurality of nozzle openings 100a directed toward the wall 77 for return of liquid for agitation in the location B for mixing. The plates 88, 89 and 90, like the plate 83 preferably have their side margins spaced from the side walls 65 and 66 and from the partition walls 77, 78 and 79 respectively, to permit of upward flow from the respective locations B to B', C to C' and D to D'.

The walls 77 and 86 and 78 and 87 have therebetween downwardly converging walls 96c and 96d similar to the walls 96 with upper fluid delivery connections 50 and 60, lower fluid withdrawal connections 103 and 104 communicating with the locations C and D, fluid return connections 105 and 106 with nozzle openings 105a and 106a directed toward the walls 78 and 79 and interposed motor driven pumps 109 and 110.

The top cover 70 has a slot 52 therein and plate 53 secured to the top cover 70 and covering the slot 52 above the wall 77, similar to the slot 43 and plate 44, a slot 62 therein and plate 63 secured to the top cover 70 above the wall 78 and a slot 54 and plate 64 above the wall 79. The slots 52, 62 and 54 operate like the slot 43.

A collection and storage location E is provided within the tank 20 bounded by the partition wall 79, the end wall 68 and contiguous portions of the side walls 65 and 66 and to which liquid is delivered through the slot 54 over the top edge of the partition wall 79. The location E has a fluid delivery connection 112 in communication therewith for delivery of the admixed materials for use.

The cover 70 has a pipe 114 connected thereto which is in communication with a receiver 115, preferably an expansible chamber and which may be a bag, for the delivery of entrapped gas or vapor at the location E to the receiver 115 when the level at the location E rises, and for the return of the entrapped gas or vapor when the level falls.

In the interior of the location E, a vertical guide tube 116 is provided having a float 117 therein with a magnet 118 carried by the float 117. Upper and lower proximity switches 119 and 120 are provided responsive to the magnet 118 for low level turn-on and high level turn-off as determined by the position of the float 118. The switches 119 and 120 are connected by a conductor 126 to a motor controller 122.

The pumps 18, 30, 40, 49 and 59 may be driven in any desired manner but it is preferred to provide an electric motor 121 having a motor controller 122 with a shaft 121a, shown diagrammatically in broken lines, to simultaneously drive all the pumps.

The liquid presence control elements 28, 38, 48 and 58 are connected by a conductor 123 to the motor controller 122 to stop the motor 121 in the event of exhaustion of the chemical materials in any of the supply reservoirs 25, 34, 45 and 55 to avoid waste of chemicals.

In order to provide agitation adequate to intimately mix and distribute small quantities of chemical materials introduced in the locations A, B, C and D, motor driven circulating pumps 95, 99, 109 and 110 are preferably connected by an energizing connection 123 from the motor controller 122 through a time delay relay 124 to continue operation of the motor driven pumps 95, 99, 109 and 110 even if other portions of the apparatus have been shut off.

The mode of operation will now be pointed out.

The carrier liquid, heated if desired and to the desired temperature is supplied through the supply connection 10 to the pump 18 and therefrom to the closed mixing tank 20, the pump 18 supplying a measured quantity of carrier liquid through pipe 19, the manifold 80 and the pipe 81 to the first mixing location A while a measured quantity of the first chemical material to be added from the first supply reservoir 25 is supplied by the pump 30, as determined by its setting, to the manifold 80 and the pipe 81 to the first mixing location A. Agitation is effected by the motor driven pump 95.

The liquid from the location A advances past the plate 83 to the location A' and by reason of the addition of carrier liquid and first chemical addition passes through the slot 43 over the upper edge of the partition wall 76.

A second chemical material in liquid form from the second supply reservoir 34 is delivered through the delivery pipe 36, the manual shut-off valve 37 and the liquid presence control 38 to the pump 40. A measured quantity of this liquid delivered from the pump 40, as determined by the setting thereof, is delivered by the pipe 41 to the space bounded by the walls 76, 85 and 96 and moves downwardly therein where liquid also delivered thereto from the location B and passes through the fluid connection or pipe 98, by the suction action of the motor driven pump 99, and is returned through the pipe 100 into the location B, the pipe 100, like the other return pipes, having nozzle openings 100a directed toward the wall 77 for agitation of the liquid at the location B.

The liquid from the location B advances past the plate 88 to the location B', and passes through the slot 52 over the upper edge of the partition wall 77.

A third chemical material in liquid form from the third supply reservoir 45 is delivered through the delivery pipe 46, the manual shut-off valve 47 and the liquid presence control 48 to the pump 49. A measured quantity of this liquid, delivered from the pump 49, as determined by the setting thereof, is delivered by the pipe 50 to the space bounded by the walls 77 and 86 and the walls 96c and moves downwardly therein where liquid is also delivered thereto from the location C and passes through the fluid connection or pipe 103, by the suction action of the motor driven pump 109, and is returned through the pipe 105 into the location C, the pipe 105, like the other return pipes having nozzle openings 105a directed toward the wall 78 for agitation of the liquid at the location C.

The liquid from the location C advances past the plate 89 to the location C' and passes through the slot 52 over the upper edge of partition wall 78.

A fourth chemical material in liquid form from the fourth supply reservoir 55 is delivered through the delivery pipe 56, the manual shut-off valve 57, and the liquid presence control 58 to the pump 59. A measured quantity of this liquid, delivered from the pump 59, as determined by the setting thereof, is delivered by the pipe 60 to the space bounded by the walls 78 and 87 and the walls 96d and moves downwardly therein where liquid is also delivered thereto from the location D and passes through the fluid connection or pipe 104 by the suction action of the motor driven pump 110, and is returned through the pipe 106 into the location D, the pipe 106, like the other return pipes, having nozzle openings 106a directed toward the wall 79 for agitation of the liquid at the location D.

The liquid from the location D advances past the plate 90 to the location D' and passes through the slot 62, over the upper edge of partition wall 79 and into the space E.

The cover 70 has the fluid connection 114 extending from the top of the space E to the expansible chamber 115 for transfer of gas to and from the chamber 115 to accommodate the fluctuation in level in the space E.

The delivery connection 112 extends from the space E for delivery of the mixture for use.

It will be noted that the supplies from the supply reservoirs 25, 34, 45 and 55 are controlled by the valves 26, 36, 46 and 56, respectively. The absence of liquid available in the supply reservoirs 25, 34, 45 and 55, as determined by the controllers 28, 38, 48 and 58, is effective to shut-off the motor 121 through the motor control 122 in the event of exhaustion of the contents of any of these supply reservoirs and thereby avoid the waste of chemicals.

It will be noted that the motor driven pumps 95, 99, 109 and 110 are controlled through conductor 123 and time delay relay 124 for continuing the agitation in the spaces A, B, C and D for a predetermined time for proper mixing.

The level in the space E, as determined by the positioning of the float 117 with its magnet 118 in relation to the proximity switches 119 and 120 through the conductor 126 also controls the motor 121 to shut off operation when the float 117 is at its upper position and to initiate operation when the float 117 is at its lower position.

We claim:

1. Mixing apparatus for fluent materials comprising tank means having a plurality of vertical compartments and a bottom wall portion,
   each of said compartments having a downwardly directed fluid delivery member extending downwardly to a location in spaced relation to the bottom wall portion,
   a horizontal partition intermediate the top and bottom of said fluid delivery member and separating said compartments into an upper storage space and a lower space with fluid access therebetween,
   a supply connection for a first supply of liquid,
   means for intermittently delivering a measured quantity of liquid from said first supply connection through said fluid delivery member to said lower space,
   a supply connection for a second supply of liquid,
   means for intermittently delivering a measured quantity of liquid from said second supply connection through said fluid delivery member to said lower space,
   means comprising a pump externally disposed with respect to said lower space and having inlet and delivery connections connected to said lower space for continuously agitating the liquid in said lower space, and
   liquid storage means for the reception of liquid from said receptacle,
   the intermittent supplying of said measured quantities of said liquids advancing the liquid through said tank means.

2. Mixing apparatus as defined in claim 1 in which said each of said means for delivering a measured quantity of liquid is a pump.

3. Mixing apparatus as defined in claim 2 in which each of said pumps is a motor driven pump.

4. Mixing apparatus as defined in claim 2 in which at least one of said pumps is an adjustable output bellows pump.

5. Mixing apparatus as defined in claim 1 in which both said means for delivering a measured quantity of liquid are driven together.

6. Mixing apparatus as defined in claim 1 in which means is provided interposed between said second supply of liquid and said means for delivering a measured quantity for deactivating said means for delivering upon exhaustion of liquid supplied to said means for delivering.

7. Mixing apparatus as defined in claim 1 in which said means for agitating the liquid in said first mixing chamber comprises a motor driven pump.

8. Mixing apparatus as defined in claim 1 in which said tank means has a top cover and at least some of said partition walls extend downwardly from said top cover.

9. Mixing apparatus as defined in claim 1 having, in addition,
   means for delivering liquid from said upper storage space to said fluid delivery member for delivery to a lower space in a subsequent vertical compartment,
   a supply connection for a third supply of liquid,
   means for supplying a measured quantity of liquid from said third supply of liquid to said lower space of said subsequent vertical compartment, and
   means comprising a pump externally disposed with respect to said lower space of said subsequent vertical compartment and having inlet and delivery connections connected to said lower space for continuously agitating the liquid in said lower space of said subsequent vertical compartment.

10. Mixing apparatus as defined in claim 9 in which said liquid storage means has a gaseous fluid receiver connected thereto for reception of gaseous fluid upon rise in liquid level in said liquid storage means and return of gaseous fluid upon fall of liquid level in said liquid storage means.

11. Mixing apparatus as defined in claim 9 in which said compartments are separated by a plurality of horizontally spaced upright partitions extending upwardly from said bottom wall.

12. Mixing apparatus as defined in claim 11 in which said tank has a top cover and at least some of said partition walls extend downwardly from said top cover in spaced relation to the upwardly extending partition walls.

13. Mixing apparatus as defined in claim 12 in which supply connections for liquid supply are connected to the space between a continuous pair of upwardly and downwardly extending partition walls.

14. Mixing apparatus as defined in claim 12 in which delivery connections are provided communicating with the space between a contiguous pair of upwardly and downwardly extending partition walls and a contiguous liquid containing upper space in said tank means for withdrawal of liquid therefrom.

15. Mixing apparatus as defined in claim 1 in which said liquid storage means has means responsive to the level of the liquid therein for controlling the actuation of said means for delivering a measured quantity of liquid.

* * * * *